United States Patent [19]
Kalb et al.

[11] Patent Number: 5,780,988
[45] Date of Patent: Jul. 14, 1998

[54] METHOD FOR DETECTING THE POSITION, DIRECTION OF ROTATION AND ROTATIONAL SPEED OF A ROTATABLY SEATED PART

[75] Inventors: Roland Kalb, Rossach; Jurgen Seeberger, Rattelsdorf, both of Germany

[73] Assignee: Brose Fahrzeugteile GmbH & Co. KG, Coburg, Germany

[21] Appl. No.: 622,186

[22] Filed: Mar. 25, 1996

Related U.S. Application Data

[63] Continuation of Ser. No. 240,932, May 11, 1994, abandoned.

[30] Foreign Application Priority Data

May 11, 1993 [DE] Germany .............. 43 15 637.1

[51] Int. Cl.$^6$ .................................................. G05B 19/29
[52] U.S. Cl. .................. 318/603; 318/601; 318/613; 318/616
[58] Field of Search ...................... 318/560–672, 318/280–300

[56] References Cited

U.S. PATENT DOCUMENTS

| | | | |
|---|---|---|---|
| 3,842,331 | 10/1974 | Hendrickson et al. | 318/603 X |
| 4,215,301 | 7/1980 | Mason | 318/603 |
| 4,259,625 | 3/1981 | Hatakeyama et al. | 318/328 |
| 4,287,461 | 9/1981 | Promis et al. | 318/603 |
| 4,376,970 | 3/1983 | Ilseman | 318/603 X |
| 4,398,138 | 8/1983 | Kohzai et al. | 318/603 |
| 4,473,786 | 9/1984 | Miyashita et al. | 318/602 |
| 4,586,152 | 4/1986 | Hayashida et al. | 318/570 |
| 5,245,258 | 9/1993 | Becker et al. | 318/266 |
| 5,316,263 | 5/1994 | Mino | 318/685 |

FOREIGN PATENT DOCUMENTS

| | | |
|---|---|---|
| 810055 | 9/1978 | Germany . |
| 3034118 | 3/1982 | Germany . |
| 3742357 | 6/1988 | Germany . |
| 108295 | 9/1991 | Germany . |
| 63-304307 | 12/1988 | Japan . |

*Primary Examiner*—David S. Martin
*Attorney, Agent, or Firm*—Christie, Parker & Hale, LLP

[57] ABSTRACT

The present invention provides a method for detecting the position, direction of rotation and rotational speed of a rotatably seated part, which are employed, for example, in particular in externally-operated locking parts of motor vehicles (e.g., with an electric window opener with protection against jamming). The method allows a reduction in the number of components and installation space. The method of the present invention has the feature that control commands and the state of the motor are provided to a logical evaluation device. Either the high and low edges of the digitized signal, or one of the high or low edges, together with the signal level at the time of motor start or reversal of the direction of rotation of the motor are assigned to the one or the other direction of movement (direction of rotation).

5 Claims, 9 Drawing Sheets

METHOD FOR DETECTING THE POSITION, DIRECTION OF ROTATION AND ROTATIONAL SPEED OF A ROTATABLY SEATED PART

CROSS-REFERENCE TO RELATED APPLICATION

This is a continuation of application Ser. No. 08/240,932, filed May 11, 1994 now abandoned.

FIELD OF THE INVENTION

The present invention relates to a method for detecting the position, direction of rotation and rotational speed of a rotatably seated part, which is employed, for example, in externally-operated locking parts of motor vehicles (e.g., an electric window opener with protection against jamming). The present invention results in a reduction in the number of components and installation space.

BACKGROUND OF THE INVENTION

Known devices for detecting the position and direction of rotation employ dual-channel sensors, the signals of which are phase-shifted and are evaluated in an electronic unit. The sensors employed can operate in accordance with quite different physical principles (e.g., electrical, magnetic, inductive, and optical).

The electric motor drive in accordance with European Patent Publication EP 0 359 853 B1, for example, uses two Hall sensors which are angularly offset with respect to each other and are assigned to a ring magnet fastened on the rotor shaft. When the rotor shaft turns, two respectively phase-shifted signals are generated by the Hall sensors and evaluated in an electronic unit. These digitized signals form the exclusive basis for determining the direction of rotation. Since the corresponding signal pattern of each direction of rotation is characteristic (i.e., different), the counting pulses are definitely assignable to a direction of rotation.

However, the known technical solution cannot operate with less than two sensor channels. Thus, it can only be accomplished with a correspondingly large outlay of components and lines. Further, a large amount of structural space is needed for the known solution. Such a large space negatively impacts the production of small drive units using integrated electronics.

SUMMARY OF THE INVENTION

Briefly, an embodiment of the present invention involves a method for indicating the position, direction of rotation and rotational speed of a part moved by rotation of a motor using a single position sensor. Digitized signals of the single position sensor are evaluated by a logical evaluation device. Control commands and the digitized signals are transmitted to the logical evaluation device for the evaluation. Using the evaluation device, signal edges of the digitized signals are assigned to a direction of movement of the part based on the control commands, the state of the motor, and digitized signals. The counter is adjusted responsive to the digitized signals in one of two directions based on the assignment and, therefore, the counter indicates the position of the part. Preferably, a characteristic of the digitized signals is used as an indication of speed.

One embodiment of the present invention involves a method for detecting the position, direction of rotation and/or rotational speed of a rotatably seated part that provides an accurate evaluation using only one sensor channel.

2

One application of this embodiment is in connection with industrial mass-production, for example, for adjusting devices in motor vehicles. The present invention is used in conjunction with, for example, a motor or gear shaft of an externally-operated locking part (e.g., an electric window opener with protection against jamming). Other applications of the present invention are also possible.

Position, direction of rotation, and rotational speed are evaluated according to the present invention by evaluating the edges of a digitized signal as a function of control commands of a motor. Control commands from a motor are provided to an electronic unit of the present invention. The direction of rotation of incoming sensor signal edges, is determined based on the direction and length of the control command.

The invention provides multiple techniques for evaluating signal edges. In one embodiment, a signal's high edges are assigned to one direction of rotation while the low edges are assigned to another direction of rotation. In an alternate embodiment, only one edge type (i.e., high or low) is used as the basis for signal evaluation. Where only one edge is used, the edge is evaluated relative to one of the levels of the digitized signals. Examples of benchmarks include signal levels associated with a start of a motor or a reversal in the direction of rotation of the motor).

The signal edges (i.e., high and low, or high or low edges) of digitized signals of a single-channel position sensor are evaluated by a logical evaluation device of the electronic unit of the present invention in conjunction with the control commands and the state of the motor. A counter value associated with a position (or rotation) of the motor or gear shaft is incremented or decremented by a value. The counter value indicates, for example, the position of an adjustable part (e.g., a power window) whose movement is driven by the motor.

One embodiment of the present invention provides the ability to detect the position, direction of rotation and rotational speed of the respective adjustable part in the case where there is no after-running when the voltage supply to a motor (e.g., rotating or linear drive) is shut off (e.g., when overload occurs). In such cases, the motor completes its rotation once current is shut off from the motor and sensor signals indicating movement of the motor also terminate at that point.

Another embodiment of the present invention evaluates the signal edges in a case where a motor does not come to an immediate stop and experiences a few rotations of the rotor caused by the motion impetus of the motor) upon termination of a supply voltage to the motor. In such a case, it is necessary to perform an evaluation of any signal edges that occur after the motor has been switched off to assign these signal edges to a direction of rotation, and to make any necessary corrections to the position identification provided by a counter.

To ensure a valid assignment of the signal edges to one or the other direction of rotation, time markers or time frames are established. These time markers are functions of the kinematic circumstances of the system (adjusting device). These time markers are calculated and verified with the aid of fixed and variable effect values.

Figure 4:
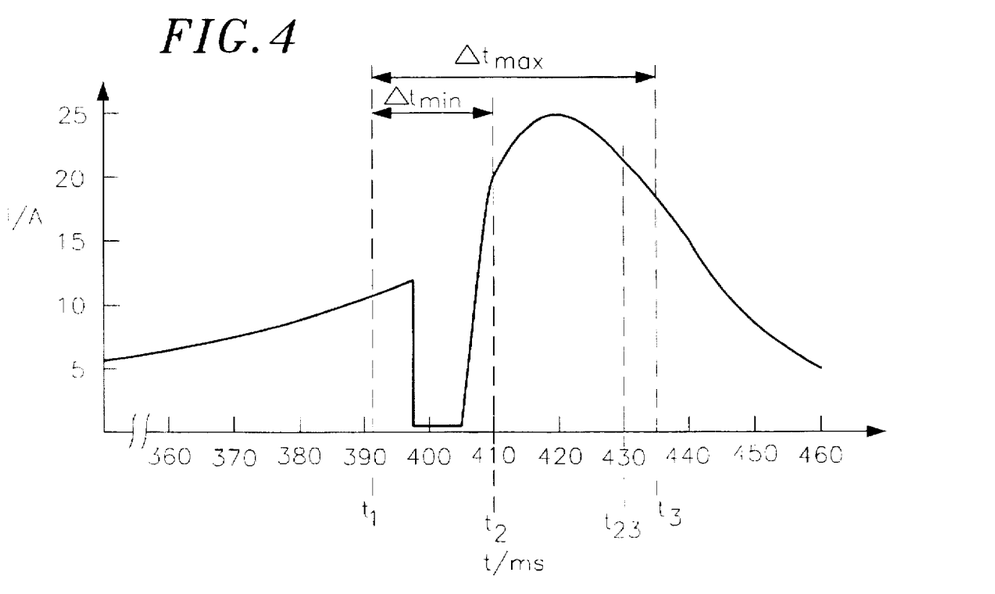
FIG. 4 is a waveform diagram which illustrates current as a function of time for a window opener motor reversed in an opposite direction at time t.

Referring, for example, to FIG. 4 time, $t_1$, establishes the start time of the control command. Time $t_2$, represents the time (preferably an empirically determined time) before which a reversal of the direction of motor rotation has not been possible. Time $t_3$ represents the latest possible time for a reversal of the direction of rotation, and a time limit after which an arriving sensor signal edge is assigned to a new direction of rotation. Time $t_3$ further corresponds to the time of the second edge of a digitized sensor signal that occurs subsequent to time $t_2$.

A minimum motor after-turning time, $\Delta t_{min}$ represents the time difference between time $t_1$ and time $t_2$. Time $\Delta t_{min}$ identifies the time within which virtually no reversal of the direction of rotation can occur.

A maximum motor after-running time, $\Delta t_{max}$, represents the time difference between time $t_1$ and time $t_3$. Time $\Delta t_{max}$ represents a time no later than which a reversal of direction of rotation is recognized by the logical device. Signal edge assignment occurs as a function of minimum after-running time, $\Delta t_{min}$, and maximum after-running time, $\Delta t_{max}$. Signal evaluation is performed differently based on the direction of the new control command and the time of its occurrence. If, for example, a control command occurs after time $t_3$ of a previous stop command, it is assumed that the motor has come to a rest. Therefore, a subsequent sensor signal is evaluated as though a system had been stopped and restarted.

If two control commands are issued in the same direction within a short sequence such that the second control command occurs prior to time $t_3$, the sensor signal edges are assigned to the same direction of movement as the signal edges for the first-issued control command. In contrast, when a control command occurs in the opposite direction, the sensor signal edges registered between times $t_2$ and $t_3$ are assigned to a new direction of rotation and corrected, if necessary.

The situation is different with sensor signal edges occurring up to time $t_2$, or after time $t_3$. Where a sensor signal edge occurs prior to time $t_2$, the sensor signal edges are assigned to the last direction of movement, since no reversal of the direction of movement has occurred. Sensor signal edges that occur after time $t_3$ are assigned to a new (e.g., opposite) direction of rotation.

Where signal edges are registered between time $t_2$ and time $t_3$, a correction to the counter reading may be necessary to reflect a correct direction of rotation. The counter reading correction is determined in accordance with two different techniques.

According to one technique, the counter reading for the previous direction of movement is adjusted by one counting unit based on the signal levels at time markers provided by the present invention. An adjustment is performed to reflect a new direction of rotation where the sensor signal level (e.g., high) at time $t_2$ and time $t_{23}$ (i.e., time that represents the maximum, actual, after-running of the drive) coincides with the actual edge direction (e.g., high) of the new (i.e., opposite) direction of rotation, and an edge to be counted has been detected within this time frame.

According to another technique, counter adjustment is determined by a comparison of the level lengths of successive levels of the digitized sensor signal levels. The counter reading of a previous direction of rotation is to be corrected by one counting unit, where the level length after the first signal edge following time $t_2$ is shorter than the level length of an immediately succeeding complementary level.

A stop command is triggered, for example, manually or by the logical control device to stop the movement of the movable object (e.g., window). Following a stop command triggered manually or by the logical control device (e.g., to shut off the position), signal evaluation is performed in such a way that the after-running time of the drive up to time $t_{23}$ is determined. The edge detection is reversed when time $t_{23}$ has been reached. A check of the counter value is performed by comparing the level length prior to the stop command with the level length after the stop command (i.e., after time $t_1$). If the level length prior to the stop command is greater than the level length after the stop command, reversal of the direction of rotation occurred prior to time $t_{23}$. Therefore, the counter reading is corrected by one counting unit. However, if it is determined that the level length prior to time $t_1$ (i.e., prior to the stop command) is less than the level length after time $t_1$, the reversal of the direction of rotation took place after time $t_{23}$. Thus, there is no need to correct the counter reading.

If, for example, the adjusting device reaches a final position, a lack of sensor signals is to be expected in spite of the presence of a direction of movement control command. If the logical unit used to evaluate the sensor signals does not register sensor signals for a predetermined time, a stop command is automatically triggered and the edge detection is reversed. A new control command is only released after the drive stops. This means that a potentially opposite (i.e., reset) movement (caused, for example, by a load on the power take-off side or by a jam in the system) must have come to a stop.

The present invention is further described below and an exemplary embodiment of an electric window opener with jamming protection for motor vehicles illustrates one application of the present invention.

DETAILED DESCRIPTION OF THE PREFERRED EMBODIMENT

Figure 1A:
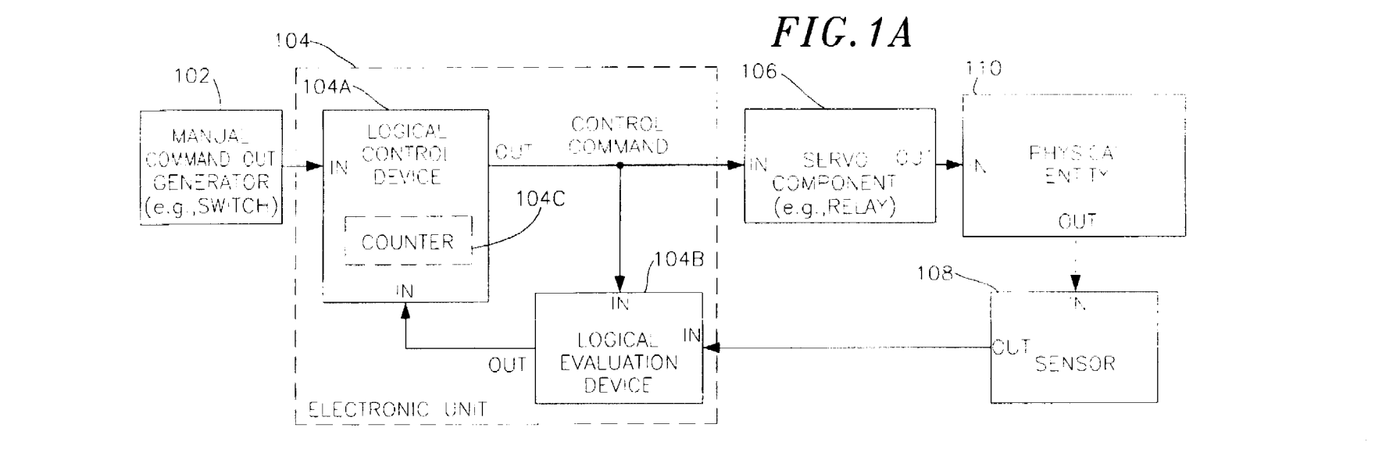
FIG. 1A is a block diagram of an adjusting device with collision protection.

FIG. 1A is a block diagram incorporating the elements for one embodiment of the present invention. A manually triggered control command is transmitted from block 102, which for example is a switch, to logical control device 104A of electronic unit 104. Logical control device 104A includes counter 104C. Control commands are generated by logical control device 104A to regulate a motor and to communicate the current state of a physical entity 110 and an adjustment part (e.g., window) of physical entity 110 whose position is being adjusted.

Logical control device 104A provides command input to logical evaluation device 104B. In the preferred embodiment, the logical control device 104A, counter 104C, and logical evaluation device 104B are integrated in a single-chip micro-controlling device thereby reducing the cost of these components.

Control commands, for example, include: raise, lower, stop, and jamming protection. A raise command causes the motor to rotate in a first direction. A lower command causes the motor to rotate in a second direction that is opposite of the first direction. The raise and lower commands are issued, for example, in response to input from a manual switch or as a result of the detection of a jam. A stop command causes the motor to stop. A stop command is issued, for example, when a manual command to change direction is received such as when a raise command is received from a switch when lower is the current direction. A stop command is further issued when a desired position is attained or when there is no detectable movement of the motor. The jamming protection command is issued when it is determined that movement (e.g., movement of a power window) is obstructed in some manner.

The control commands output by logical control device 104A provide information for regulating the physical entity 110 and for communicating the current state of the physical entity 110. The output of logical control device 104A becomes an input of logical evaluation device 104B and servo component 106, which, for example, is a relay. Control commands that are transmitted to servo component 106 modify the actual direction of rotation of physical entity 110.

Command controls together with signals transmitted from sensor 108 are used by logical evaluation device 104B to evaluate the current state of physical entity 110. Examples of states of the physical entity 110 being adjusted include, for example, stop, sudden reversal, after-running, jamming, and block. When the adjustment system is considered to be in a stopped state, it is in a state of rest and is not considered to be moving in either direction. The absence of sensor signals for a given period of time indicates a state of rest.

A state of sudden reversal indicates that a change in the direction of rotation has occurred. A state of after-running exists when a stop command has been issued and current to the motor has been shut off, but sensor signals are received that indicate continued movement. A jamming state occurs when a jam has been detected. A block state occurs when it is determined that an adjustment part of physical entity 110 (e.g., a window) has reached its final position. In the case of a power window, a final position is reached when, for example, the window is completely open or closed.

Logical evaluation device 104B determines the state based on the control commands received from logical control device 104A and the digitized signals received from sensor 108. Logical evaluation device 104B assigns a direction of rotation for a digitized sensor signal edge received from sensor 108 based on the state of the physical entity 110. Based on its determinations, logical evaluation device 104B determines whether counter 104C is to be incremented or decremented. For example, if a raise control command is received when the physical entity is in the stop state, the sensor signals received by logical evaluation device 104B from sensor 108 indicating movement of the physical entity 110 are assigned to an upward direction of rotation. Where counter 104C is incremented to indicate an upward direction, logical evaluation device 104B would transmit a signal to increment counter 104C.

Signals from servo component 106 are transmitted to physical entity 110. Physical entity 110 preferably includes such components as a motor and gear shaft, mechanical components, and one or more adjustment parts. An example of a mechanical component is an adjustment lever. An example of an adjustment part is a window. Sensor 108 detects the movement of the adjustment part by, for example, detecting the movement of one or more of the mechanical components. For example, sensor 108 is comprised of a Hall element that detects the motion of an annular magnet with at least two poles that is attached to the shaft of motor 110A. In the case of a power window system, the transmission of the motion of the motor via the gear and the adjustment mechanics (e.g., a lever) to the power window is direct and free from slipping. The rotary motion of the motor which is determined by the sensor 108 at the motor shaft, for example, is directly related to a corresponding motion of the window. In this case, the sensor signals provided by a sensor sensing the movement of the motor shaft are used to determine the aggregate movement of the power window and, consequently, the displacement of the power window from a reference point where the counter has an assigned initial value (e.g., zero).

The speed of the power window is further determinable based on the evaluation of the sensor signals. For example, speed is, for example, given by the displacement corresponding to the number of measured sensor signal pulses divided by the time period during which the pulses were measured.

Alternatively, the determination of the speed of an adjustment part such as a power window is determined based on a constant clock frequency of the electronic unit 104 (i.e., the micro controlling device) such as 10 megahertz (MHz). This corresponds to a time interval of 0.1 microseconds (μs) between two consecutive cycles of the electronic unit 104. A second counter is added to electronic unit 104. To determine the speed of the adjustment part, the number of cycles occurring between two successive, unidirected signal edges (i.e., either high or low) is counted by the second counter to determine the period between two successive, unidirectional digitized sensor signal edges.

Figure 2:
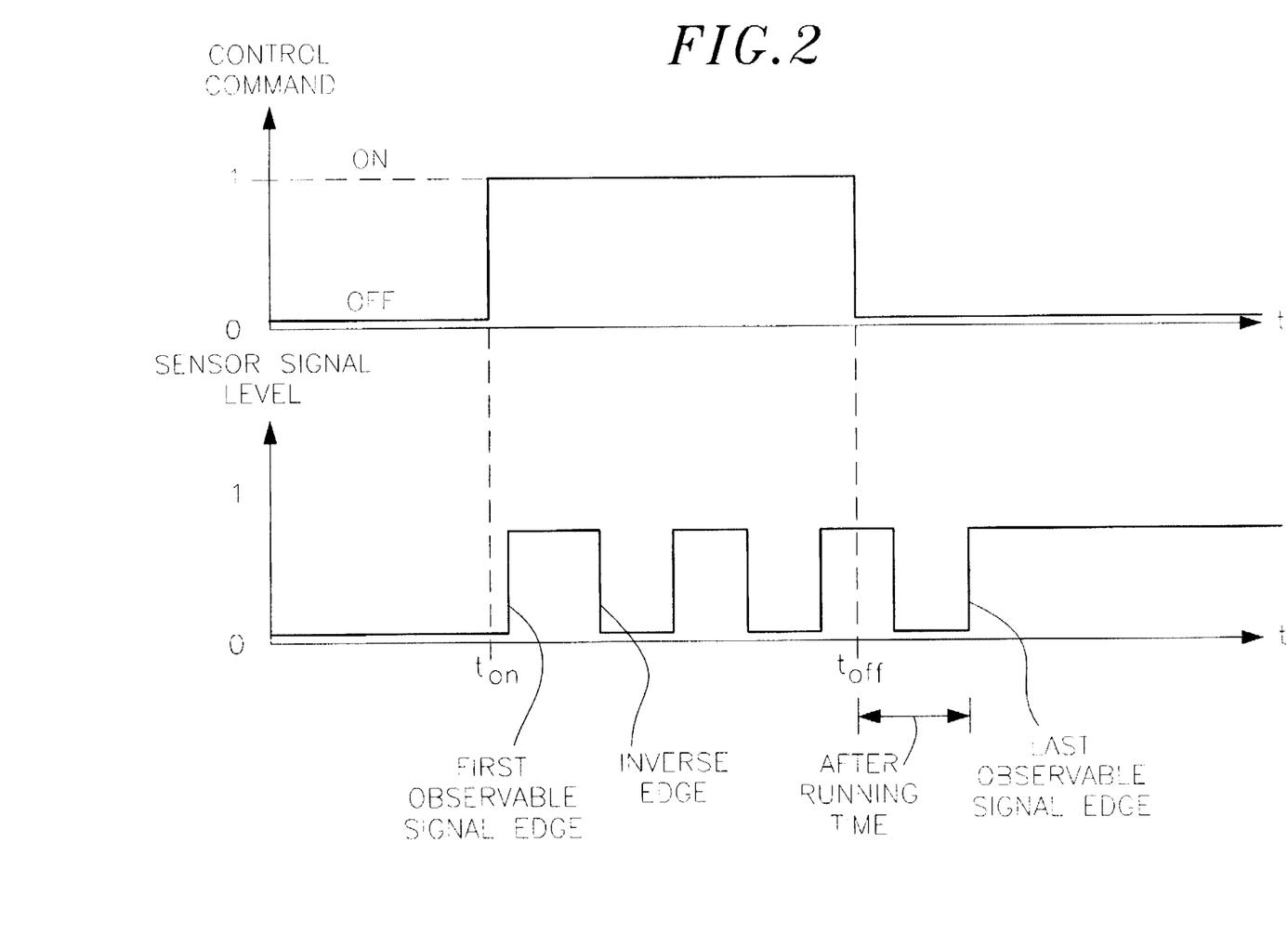
FIG. 2 illustrates a digitized sensor signal waveform prior to and as a result of a control command.

FIG. 2 illustrates a digitized sensor signal waveform prior to and as a result of a control command. Prior to time $t_{on}$, a control command has not been issued by logical control device 104A and there is no digitized sensor signal output from sensor 108 which indicates that physical entity 110 is at rest. At time $t_{on}$, a control command is issued by logical control device 104A. As a result of the issuance of a control command at time $t_{on}$, motor 110A of physical entity 110 is excited and begins to work after a short time lag. The first digitized sensor signal edge occurs shortly after time $t_{on}$. Signal edges generated as a result of the movement of motor 110A are evaluated by logical evaluation unit 104B. The high signal edge occurring after time $t_{on}$, for example, is used by the logical evaluation device 104B to determine any modification to counter 104C. In an alternative example, the low signal edge is used to update the counter 104C.

At time $t_{off}$ the motor is switched off. However, due to the mass inertia, digitized signal edges may occur after time $t_{off}$. The time period starting at $t_{off}$ and ending with the last observable sensor signal is called the after-running time.

In one embodiment of the present invention, a signal edge (e.g., high edge) is assigned to one direction of rotation while the low edges are assigned to another direction of rotation. In another embodiment, only one edge type is used as the basis for signal evaluation and the signal edge is evaluated relative to benchmark levels associated with the start of the motor or a reversal of direction, for example.

For example, the high signal edges represent forward direction and the low signal edge represents a backward direction. In the case of a power window adjustment system, the counter is incremented for each high edge as the power window is being raised and decremented for each low edge as the power window is being lowered, or vice versa. Therefore, the period of the digitized signal represents a defined, constant displacement of the adjustment part. Each counter reading is therefore assigned to a certain position of the adjustment part and the actual position of the adjustment part is determined at any time using a single counter.

Figure 3A:
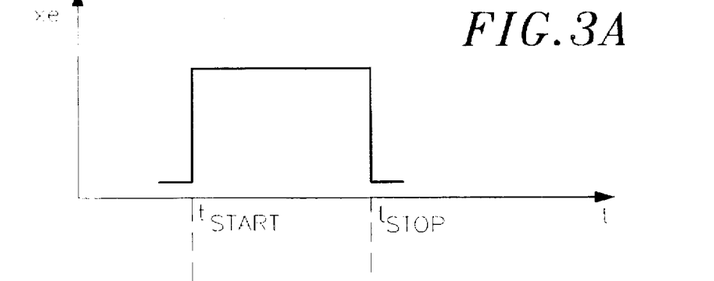
FIG. 3A is a waveform diagram which illustrates an input signal Xe (for example, from block 106 of FIG. 1A).
Figure 3B:
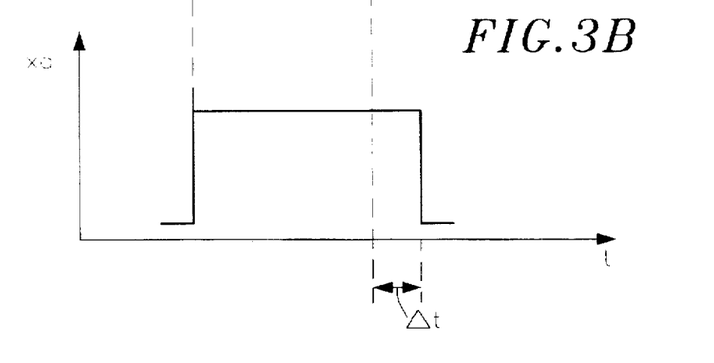
FIG. 3B is a waveform diagram which illustrates the transient response Xa (for example from block 110 of FIG. 1) resulting from the input signal (e.g., Xe).

FIGS. 3A and 3B illustrate the behavior of a physical entity 110 in which the mass inertia or the motion impetus of the physical entity 110 results in after-running of the adjusting system. FIG. 3A shows the length over time of the input signal between start time, $t_{start}$, and stop time, $t_{stop}$, during which a motor is provided with drive current, for example. It can be seen from the transient response Xa in FIG. 3B that the displacement time of the physical entity 110 is greater than the length of the input signal (e.g., current) by an amount, $\Delta t$. Time $\Delta t$ corresponds to the after-running time of the drive.

FIG. 4 illustrates current, in the drive windings of an electric motor driving a window opener, for example, as a function of time. Time $t_2$ represents the time by which virtually no reversal of the direction of rotation can take place. It is located as closely as possible to the time $t_1$, the time of the control command. On the other hand, time $t_3$ represents the outer time limit for reversal of direction of rotation or direction of movement. At time $t_3$, it is assumed that logical evaluation device 104B can already reliably detect a reversal of the direction of rotation of the physical entity 110 on the basis of the analyzed signals. For this reason, the actual maximum after-running of the drive motor is prior to the time $t_3$. Therefore, the actual maximum after-running of the drive is limited by the time $t_{23}$ prior to time $t_3$.

All time constants mentioned are determinable empirically or mathematically. For example, time $t_{23}$ is preferably determined empirically. The method employed essentially depends on the effort which has to be made to obtain time constants using either method. The minimum after-running time, $\Delta t_{min}$, is the difference between time $t_1$ of the control command and time $t_2$. The maximum after-running time, $\Delta t_{max}$, is the time difference between the time $t_1$ and time $t_3$.

In FIG. 4, the current in the drive windings of the motor, shown as a function of time, illustrates a jamming process of an electrically operated window opener system with collision protection. First, assume the current in the drive windings of the motor climbs steadily until the collision protection subsystem of the window opener system is triggered. Once collision protection is triggered, an adjusting command is issued by logic control device 104A at time $t_1$ to rotate the electric motor in the opposite direction.

In FIG. 4, the current is shown as a function of time after a jam for a motor with a servo component 106 containing one relay for each direction of rotation, whereby the switch-on delay (e.g., 4 ms) of the relays 106 is smaller than their switch-off delay (e.g., 12 ms). At approximately 360 ms a jam occurs and the current increases. At $t_1$ the electronic unit 104 has determined the occurrence of the jam and a command is issued to rotate the electric motor in the opposite direction. The relay for the new direction of rotation is switched on with a delay of 4 ms at 397 ms so that the motor is short circuited and the current is zero. The relay for the previous direction of rotation is switched-off with a delay of about 12 ms at 405 ms, so that the short circuit is cancelled and a current for the opposite direction of rotation is supplied to the motor. The current shown after 405 ms corresponds to a start of a direct-current motor and shows a maximum at 420 ms and a normalization of the operation state at 460 ms. As illustrated in FIG. 4, no reversal of direction is possible during time $\Delta t_{min}$. Further, any reversal of direction occurs within time $\Delta t_{max}$. A similar current curve would result for a motor with one relay for both directions of rotation.

Figure 1B:
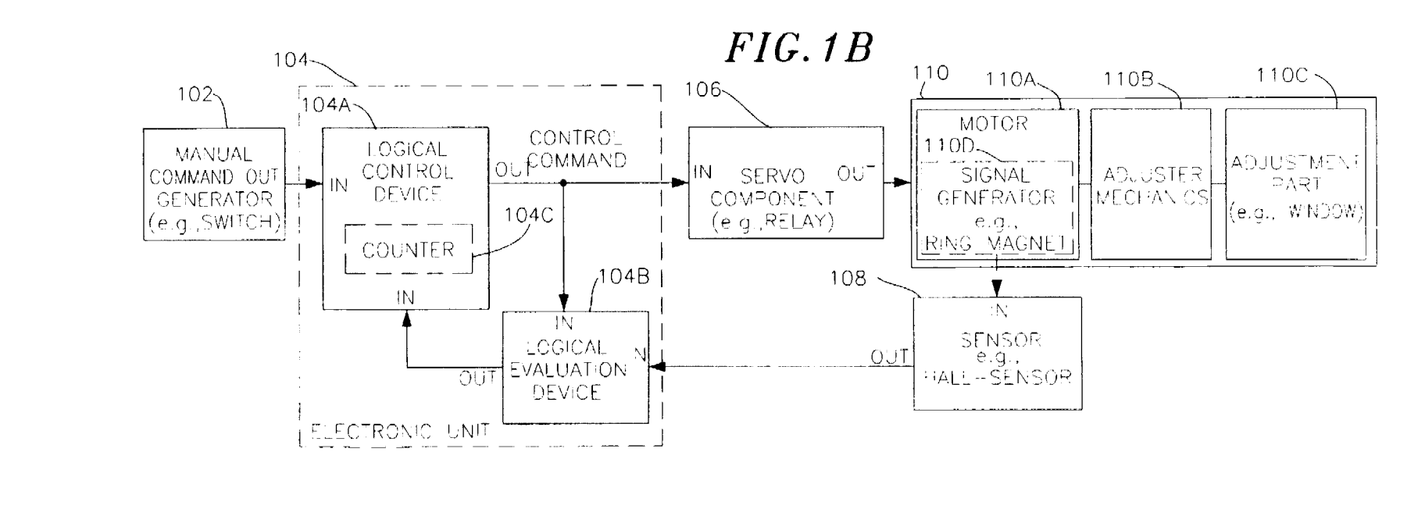
FIG. 1B is a block diagram illustrating an electronic window opener physical entity.

A block diagram illustrating an application of the present invention for detecting the position of a window in an electrical window opener system. The components illustrated in FIG. 1B have the same function as the same-numbered components in FIG. 1A. Referring to FIG. 1B, physical entity 110 is comprised of an electric motor 110A, adjuster mechanics 110B, and window 110C in an electric window opening system. Motor 110A includes a signal generator such as a ring magnet that is, for example, attached to the motor shaft. Adjuster mechanics 110B include, for example, a lever or a mechanical displacement device that is coupled to window 110C to drive window 110C in an upward or downward direction. Position sensor 108 detects the movement of the adjuster mechanics 110B, for example, and the resulting digitized sensor signals are generated by sensor 108 for evaluation by logical evaluation device 104B. Logical evaluation device 104B provides input to logical control device 104A regarding any changes to counter 104C.

A change in direction of window 110C caused by a control command designating an opposite direction occurs only after physical entity 110 has come to a stop. To effect a stop and then a reversal of direction, current is shut-off to physical entity 110 by relay 106. Where physical entity 110 is not capable of an instantaneous stop and after-turning occurs, logical evaluation device 104B monitors the digitized signals from sensor 108.

When logical evaluation device 104B detects the absence of digitized sensor signals, it is assumed that physical entity 110 has come to a stop. Logical evaluation device 104B informs logical control device 104A of the state of physical entity 110 including its direction of rotation and state of movement or rest. Logical control device 104A issues the control command to initiate movement in the opposite direction when it is determined that physical entity 110 has come to a stop. For example, a control command supplied to servo component 106 causes current to be applied in an opposite direction and motor 110A and physical entity 110 to rotate in a different direction.

Application of the present invention to detect the position of the window in an electrical window opener system with jamming protection is illustrated by process flows provided in FIGS. 5A–5D. The process flows take into account all potential operational states of an electrical window opener with jamming protection and contain all evaluation specifications or decision criteria.

Figure 5A:
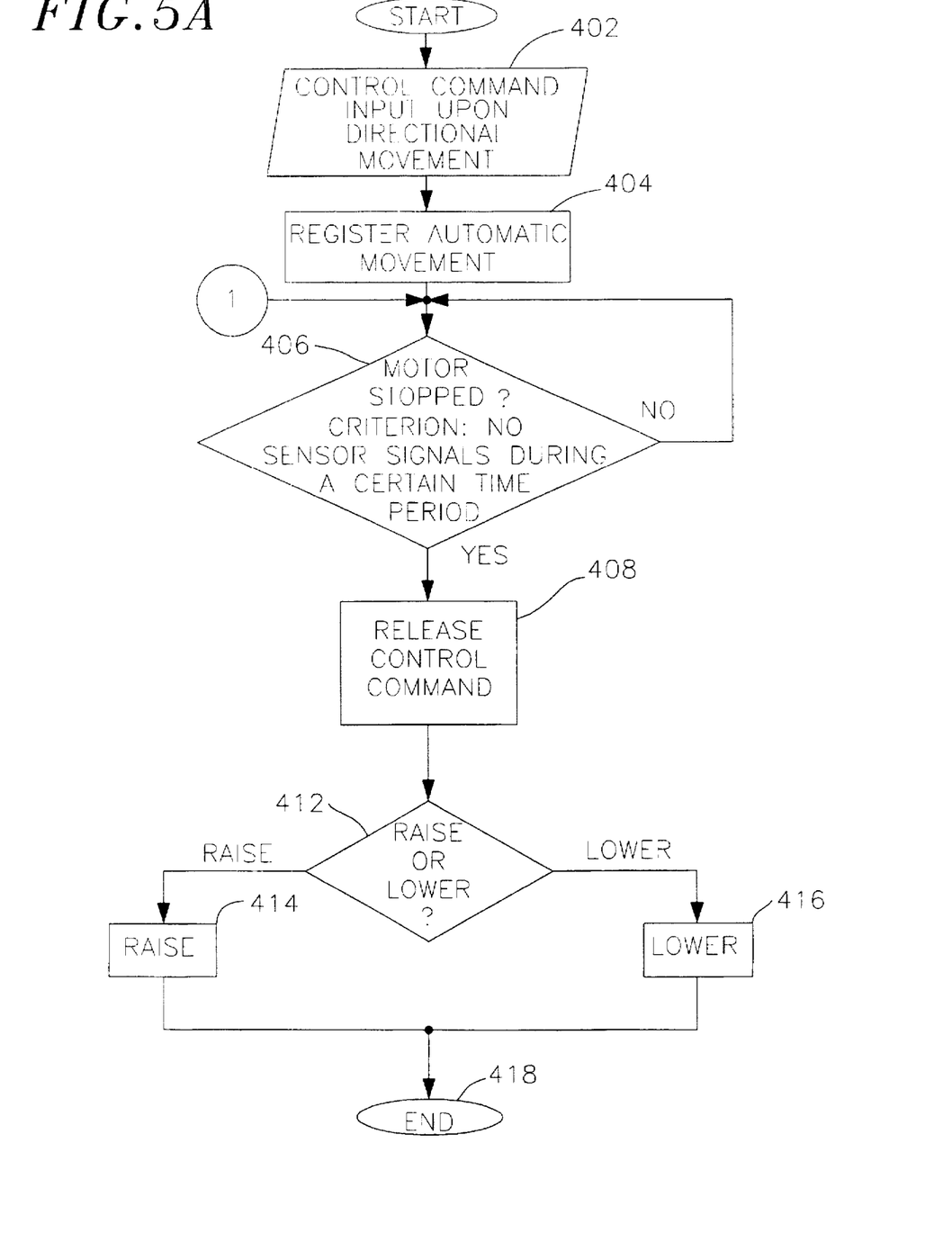
FIGS. 5A–5D are flow diagrams illustrating a process flow for detecting the position of an electrically driven window opener system with jamming protection.

Referring to FIG. 5A, a control command is issued as a result of a directional movement operation performed by command generator 102 at block 402. One feature of an electrical adjustment systems such as a power window system is the ability to generate automatic operation where the switch 102 is depressed for a certain time period such as 0.4 seconds. In such a case, the motor remains excited even if the switch 102 is released after 0.4 seconds. Displacement of the adjustment part continues until a stop command is given, a jam is detected, or a block (i.e., final or designated position) is detected. At block 404, the existence of an automatic movement is registered.

If logical evaluation device 104B does not detect sensor signals, due to signal level reading, for a predetermined period of time, it determines that the motor has stopped. If, at decision block 406 (i.e., "motor stopped? Criterion: no sensor signals during a certain period"), it is determined that the motor has not stopped, processing continues at decision block 406 to wait for the motor to stop. If, at decision block 406, there is an absence of sensor signals during the predetermined time period, it is assumed that the physical entity 110 is at rest and processing continues at block 408 to release the new control command. Thus, a new control command is only released after it is determined that movement of the motor has terminated. Processing continues at decision block 412.

Figure 5B:
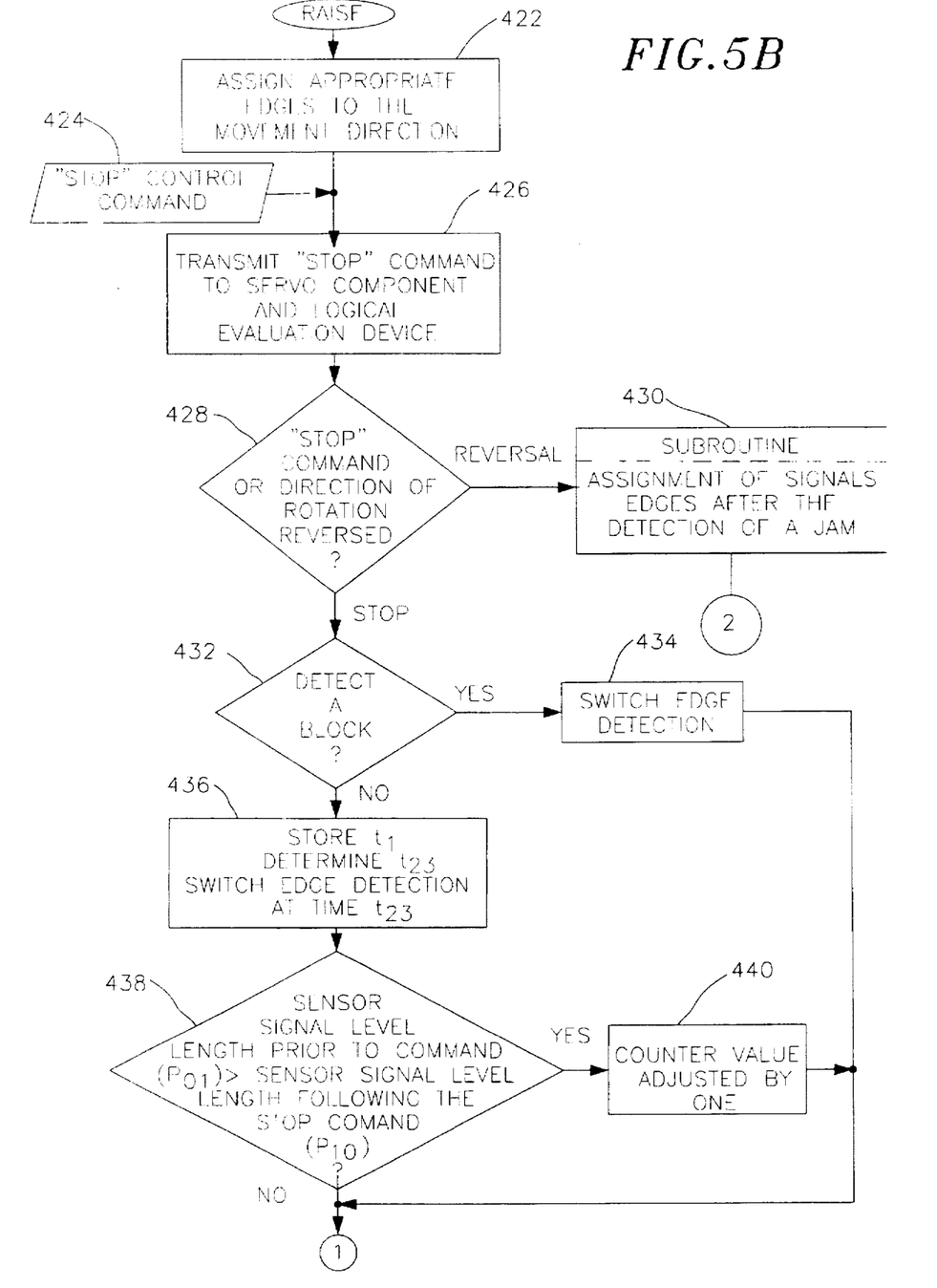

At decision block 412 (i.e., "raise or lower?"), if a raise command was transmitted to servo component 106 and logical evaluation device 104B, processing continues at block 414 to invoke a raise operation process flow (e.g., FIG. 5B). Processing ends at block 418. If, at decision block 412, it is determined that a lower command was transmitted to servo component 106 and logical evaluation device 104B, processing continues at block 416 to invoke a lower operation process flow (e.g., FIG. 5C). Processing ends at block 418.

FIG. 5B provides a raise operation process flow invoked when a raise command is transmitted to servo component 106 and logical evaluation device 104B at block 408 in FIG. 5A. Issuance of a raise command causes the window to move in the upward direction. Movement of the window is monitored by sensor 108. Sensor 108 provides digitized signals indicating the status of the movement to logical evaluation device 104B.

Movement continues in the upward direction until a "stop" command is issued by command generator 102, or by logical control device 104A when an foreign object, for example a hand or finger, is encountered in the path of the window. When the movement of the window is interrupted by the presence of a foreign object in the path of the window, the direction of movement of the window should be reversed to avoid harm to the foreign object and to limit the stress on the motor. The direction of the motor prior and subsequent to a reversal of direction of the window must be known to electronic unit 104.

Referring to FIG. 5B, at block 422, an edge, such as a high edge is assigned to the current movement direction. For example, high edges are associated with the upward movement direction causing a counter to be incremented. When a "stop" command is generated by command generator 102 at block 424, the "stop" command is transmitted to servo component 106 and logical evaluation device 104B.

A stop command occurs as a result of, for example, a determination that the adjustment part has reached a final position (e.g., open or closed in the case of a power window), when a certain positioning or displacement has occurred (e.g., positioning of a window so that it is half open or closed), when a stop command is triggered manually (e.g., from the manual command generator 102), or prior to a reversal of the direction of rotation such as when a jam has been detected. The second and third instances are referred to as a shutting-off position. A window displacement occurs when, for example, it is determined that a foreign object has become jammed in the path of the adjustment part. The adjustment part is displaced (e.g., lowered) by a certain distance to allow for the release of the foreign object.

The positioning of an adjustment part in a final position such as an open or closed position is referred to as a block. A block is determined by the counter reading corresponding to the final position. To assure that the adjustment part reaches its final position and a block occurs, the jamming detection is turned off as the adjustment part reaches a certain position away from the final position and/or within a certain zone where the occurrence of a jam is impossible.

Where jamming detection is determined by a reduction in speed that exceeds a certain minimum value or threshold, a reduction in speed that occurs in this final zone is not considered to be a jam. In identifying a final zone, it is therefore possible to differentiate between a jam and a block. For example, an upper zone, where jamming protection is turned off, for a power window exists as the power window makes contact with the sealing ledges of the window frame. Further, no jamming protection is necessary, for example, when a power window is being lowered.

At decision block 428 (i.e., "'stop' command or direction of rotation reversed?"), if a reversal in the direction of rotation is detected by logical evaluation device 104B, processing continues at block 430 to invoke a signal edge assignment routine. After completion of the edge assignment process, processing continues after block 442 in FIG. 5C.

If, at decision block 428, a "stop" command is detected by logical evaluation device 104B, processing continues at decision block 432. At decision block 432 (i.e., "detect a block?"), if a block is detected by logical evaluation device 104B, processing continues at block 434 to switch edge detection (e.g., from high to low). Upon completion of this step, processing continues at decision block 406 in FIG. 5A.

If, at decision block 432, a block is not detected, processing continues at block 436 to store the value of $t_1$, determine the value of $t_{23}$, and switch edge detection (e.g., from high to low) at time $t_{23}$. Processing continues at decision block 438.

Figure 6:
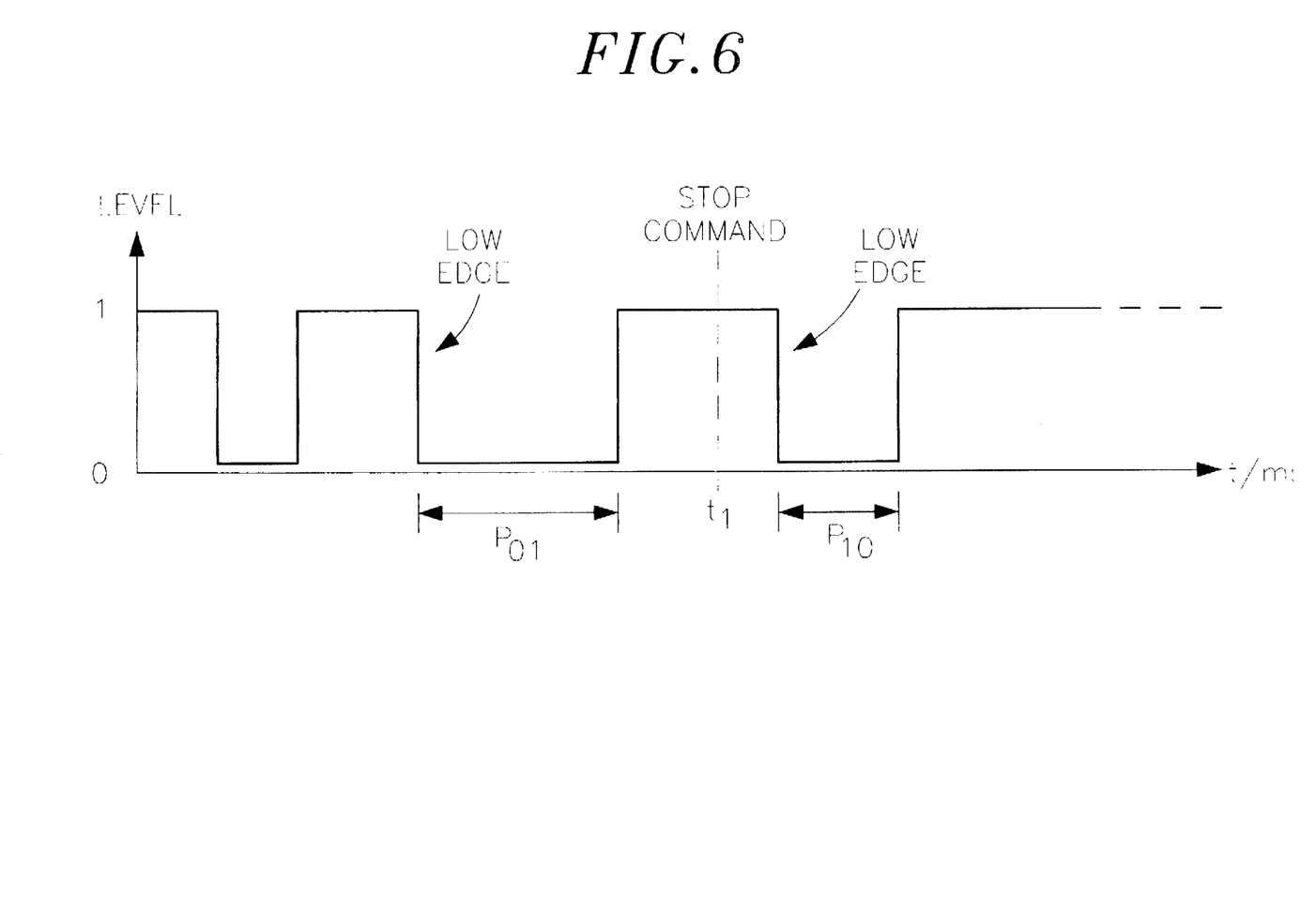
FIG. 6 illustrates a sensor signal waveform before and after a stop command.

FIG. 6 illustrates a sensor signal waveform before and after a stop command. $P_{O1}$ represents the sensor signal level length prior to the stop command. $P_{1O}$ represents the sensor level length after the stop command. Where $P_{O1}$ is greater than $P_{1O}$, the reversal of direction of rotation took place prior to time $t_{23}$, the maximum, actual after-running time. Therefore, counter 104C is adjusted. If $P_{O1}$ is less than $P_{1O}$, the reversal of direction of rotation took place after time $t_{23}$, and the value of the counter is correct and adjustment is not necessary.

The actual counter adjustment (i.e., incrementing or decrementing the counter) is based on whether the counter was incremented or decremented to register an edge (i.e., either a high or low edge) prior to the stop command. For example, if the counter was being decremented as a result of the occurrence of a low edge prior to the stop command, the counter is incremented by one when $P_{O1}$ is greater than $P_{1O}$. Conversely, if the counter was being incremented prior to time $t_1$, the counter is decremented by one where the signal length is greater prior to time $t_1$.

Thus, at decision block 438 (i.e., "sensor signal level length prior to stop command ($P_{O1}$)>sensor signal level length following stop command ($P_{1O}$)?"), the sensor signal level length prior to a stop command is compared with the sensor signal level length following the stop. If the sensor signal level length prior to the stop command is less than the sensor signal level following the stop command, reversal of direction of rotation took place after $t_{23}$. Therefore, no counter adjustment is needed and processing continues at block 406 in FIG. 5A. If it is determined, at decision block 438, that the sensor signal level prior to the stop command is greater than sensor signal level after the stop command, the reversal of direction of rotation occurred prior to time $t_{23}$. Therefore, processing continues at block 440 to adjust the counter value by one. Processing continues at block 406 in FIG. 5A.

Figure 5C:
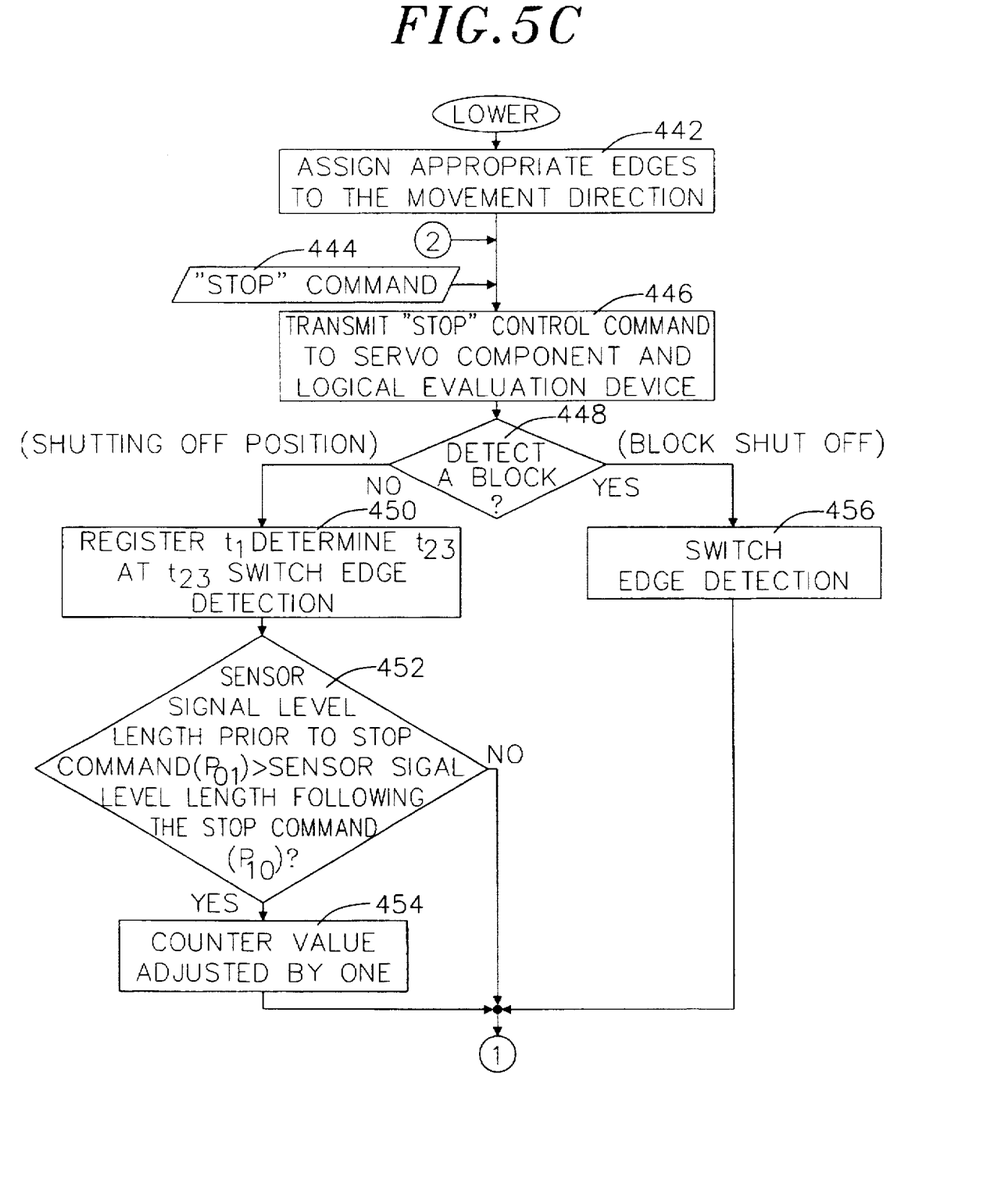

FIG. 5C provides a lower process flow invoked when a lower operation is detected at decision block 412 in FIG. 5A. Referring to FIG. 5C, at block 442, an edge (e.g., low edge) is assigned to the current movement direction. For example, low edges are associated with a downward direction by decrementing the counter.

At block 444, a "stop" command is input. At block 446, a "stop" command is transmitted to servo component 106 and logical evaluation device 104B. At decision block 448 (i.e., "detect a block?"), if a block is detected, processing continues at block 456 to switch edge detection (e.g., from low to high). For example, if the low edges were assigned to the current direction of the adjustment part (e.g., lowering, the power window) before the block detection, the high edges must be assigned to the opposite direction (e.g., raising, or closing the power window) after the block detection. This assignment remains valid until a new control command is given. Processing then continues at decision block 406 in FIG. 5A.

If, at decision block 448, a block is not detected, a shutting-off position has occurred. Processing continues at blocks 450, 452 and 453 which correspond to blocks 436, 438, and 440, respectively, of FIG. 5B. Thus, at block 450, the value of $t_1$, $t_{23}$ are determined and edge detection (e.g., from low to high) is switched at time $t_{23}$. At decision block 452 (i.e., "sensor signal level length prior to stop command ($P_{01}$)>sensor signal level length following stop command ($P_{10}$)?"), the sensor signal level length prior to a stop command is compared with the sensor signal level length following the stop. If the sensor signal level length prior to the stop command is less than the it is following the stop command, reversal of direction of rotation took place after $t_{23}$. Therefore, no counter adjustment is needed and processing continues at block 406 in FIG. 5A. If it is determined, at decision block 452, that the sensor signal level prior to the stop command is greater than sensor signal level after the stop command, the reversal of direction of rotation occurred prior to time $t_{23}$. Therefore, processing continues at block 454 to adjust the counter value by one. Processing continues at block 406 in FIG. 5A.

Figure 5D:
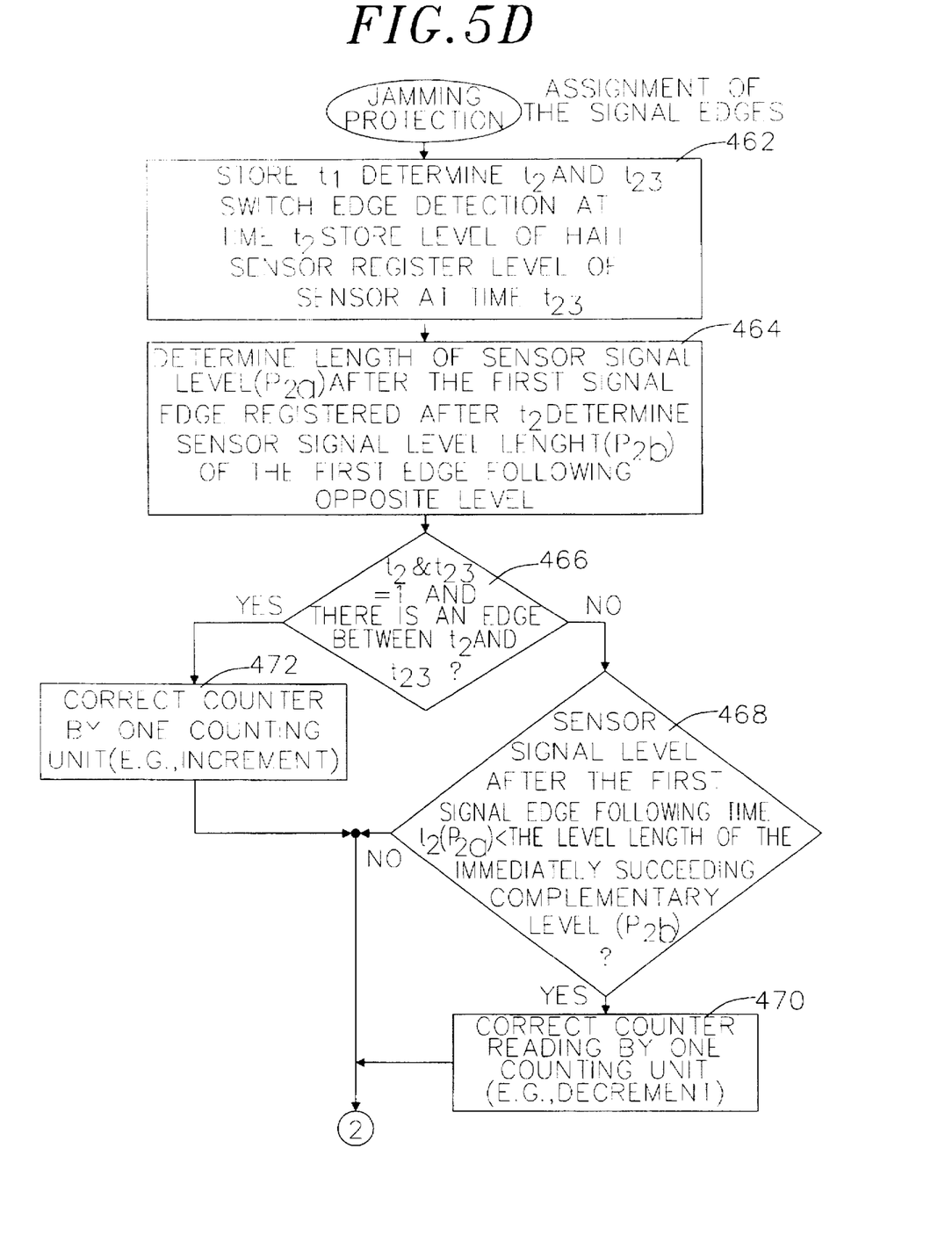

FIG. 5D illustrates an example of a jamming protection process flow that occurs when a jam is detected. Where a jam is caused by a foreign object that becomes lodged in the path of the adjustment part, a reversal of the direction of the adjustment part is effected to free the foreign object. The jamming protection state is taken into account by the logical evaluation unit 104B when evaluating the sensor signals received in this state. The jamming protection process flow illustrates the assignment of the signal edges to the directions of rotation when a jam is detected.

At block 462, times $t_1$, $t_2$ and $t_{23}$ are determined and retained. Further, edge detection is switched at time $t_2$. The level of the digitized signal from the position sensor is registered at times $t_2$ and $t_{23}$. These sensor signal level lengths are stored.

Figure 7:
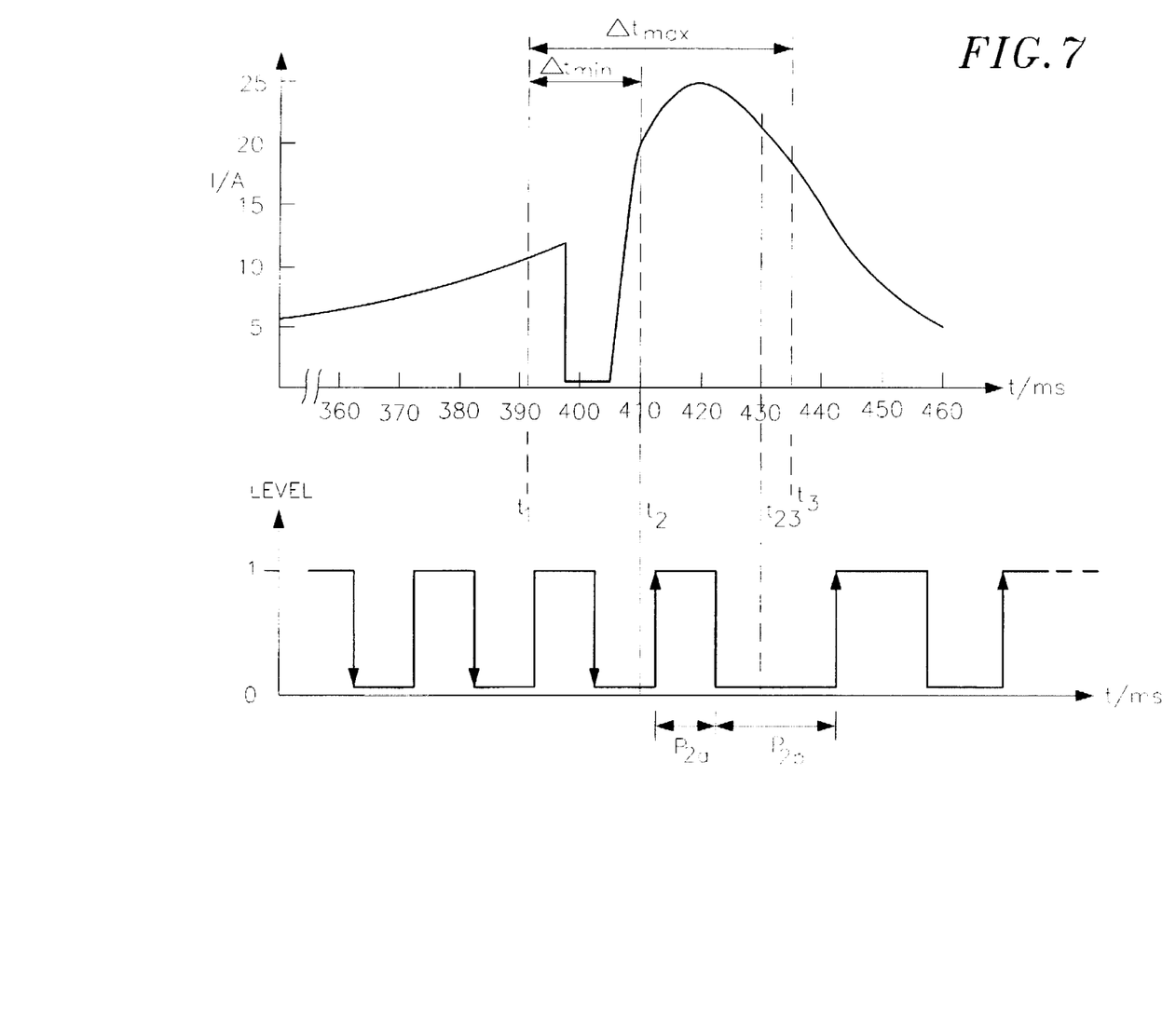
FIG. 7 illustrates a sensor signal and current waveforms following the detection of a jam and a reversal of direction.

The change of the direction of rotation of the motor after a control command in the opposite direction following the detection of a jam and the corresponding evaluation of the sensor signals are illustrated in FIG. 7. At time $t_1$, a control command is initiated. No reversal of direction is expected prior to time $t_2$. A direction reversal is expected by time $t_{23}$, and a reversal of direction must have occurred prior to time $t_3$.

At block 464, the length of the signal level after the first signal edge registered after time $t_2$ and the length of the first signal edge with an opposite level immediately following $t_2$.

length $P_{2a}$ and $P_{2b}$ in FIG. 7 respectively, are determined. At decision block 466 (i.e., "$t_2$ and $t_{23}$=1 and there is an edge between $t_2$ and $t_{23}$?"), if the sensor signal levels at times $t_2$ and $t_{23}$ are equal (i.e., both high or both low) and one signal edge occurs between times $t_2$ and $t_{23}$ as illustrated in FIG. 7, processing continues at block 472 to correct the counter by, for example, incrementing the counter by one. Processing then continues at block 444 in FIG. 5C.

If one of these conditions is not met at decision block 466, processing continues at decision block 468. At decision block 468 (i.e., "sensor signal level length after the first signal edge following time $t_2(P_{2a})$<the level length of the immediately succeeding complementary level ($P_{2b}$)?"), if the first signal level length following time $t_2$, such as $P_{2a}$ in FIG. 7, is shorter than the sensor signal level length of the immediately adjacent, alternate level such as $P_{2b}$ in FIG. 7, processing continues at block 470 to correct the counter reading by, for example, decrementing the counter by one counting unit. Processing continues at block 446 in FIG. 5C. If it is determined at decision block 468 that the condition is not met, processing continues at 446 in FIG. 5C.

The disclosure of German patent application P 43 15 637.1, filed on Nov. 11, 1993, a copy of which accompanies this application is incorporated fully herein by reference. Priority of this German application is claimed.

While the invention has been described with reference to a preferred embodiment, it will be understood that additions, modifications and adaptations can be made without substantially diverging from the scope of this invention, which is described in the claims set forth below.

What is claimed is:

1. A method for detecting the position of a part and the direction of movement of a motor moving the part using a single position sensor which provides a single train of digitized signals and a logical evaluation device, comprising the steps of counting assigned signal edges with a counter up and down based on the assignment of the signal edges to indicate position of the part, and evaluating, using the logical evaluation device, signal edges of the digitized signals, control commands and a state of movement of the motor, said step of evaluation comprising the step of either assigning, for counting, high signal edges of said digitized signals to one direction of motor movement and low signal edges of said digitized signals to the other direction of motor movement, dependent on a direction of motor movement given by the control commands and a length of the control commands, or assigning, for counting, one of the high or low signal edges of the motor together with a signal level of said digitized signals at start up time and reversal time of the motor, said step of assigning comprising the further steps of assigning, for counting, the high and low signal edges dependent on i) a minimum after-running time delta $t_{min}$ of the motor, which after-running time delta $t_{min}$ is a result of a time difference between a time $t_1$, which is the time of occurrence of one of said control commands for a change in motor movement, and a time $t_2$ before which substantially no reversal of direction of movement of the motor is possible due to the motion impetus of the motor, and ii) a maximum after-running time delta $t_{max}$ of the motor which is a result of a time difference between the time $t_1$ and a time $t_3$, time $t_3$ being the time before which a reversal of the direction of movement of the motor must have occurred.

2. A method for detecting the position of a part and the direction of movement of a motor moving the part using a single position sensor which provides a single train of digitized signals and a logical evaluation device, comprising the steps of selectively adjusting count of a counter up or down, responsive to assigned signal edges of the digitized signals for one of two directions of movement of the motor, to indicate the position of said part; and evaluating, using the logical evaluation device, signal edges of the digitized signals, control commands and the state of movement of the motor, said step of evaluating comprising the step of assigning high edges of said digitized signals to one direction of movement of the motor and low edges of said digitized signals to the other direction of movement of the motor, dependent on direction of movement of the motor given by one of the control commands and a length of the one said control command, said step of evaluating further being dependent on after-running of the motor, after a control command occurs at a time $t_1$, due to motion impetus of the motor, and said step of assigning comprising the further steps of assigning said signal edges occurring before time $t_2$ to a previous direction of movement of the motor before a reversal of direction of the motor movement where before time $t_2$ no reversal of direction of the motor movement is possible due to the motion impetus of the motor, assigning said signal edges occurring after a time $t_3$ to the new direction of motor movement, after such reversal, of the motor, where before time $t_3$ such reversal of the movement of the motor must have occurred, and assigning said signal edges occurring between the times $t_2$ and $t_3$ to the new direction of movement of the motor and correcting the counter count due to the previous direction of movement of the motor by one count unit if during a period of time between times $t_2$ and $t_{23}$ one of said signal edges has been so counted due to a new direction of movement of the motor, where time $t_{23}$ is an actual maximum after-running time of the motor before which no change in direction can take place.

3. A method for detecting the position of a part and the direction of movement of a motor moving the part using a single position sensor which provides a single train of digitized signals and a logical evaluation device, comprising the steps of adjusting count of a counter responsive to assigned signal edges of said digitized signals; and evaluating signal edges of the digitized signals, issued control commands and state of movement of the motor, said step of evaluating comprising the step of assigning high edges of said digitized signals to one direction of movement of the motor and low edges of said digitized signals to the other direction of movement of the motor, dependent on a direction given by one of the control commands and a length of the one said control command, after a control command of said commands occurs at a time $t_1$, causing a change in the motor movement, the step of evaluating further comprising the steps of considering the motor after-running due to the motion impetus of the motor, assigning the signal edges occurring before a time $t_2$, following time $t_1$, to a previous direction of movement of the motor where before time $t_2$, following the change in motor movement, no reversal of the motor movement is possible due to the motion impetus of the motor, assigning the signal edges occurring after time $t_3$, following time $t_2$, to a new direction of movement of the motor where before time $t_3$, following the change in motor movement, a reversal of direction of the motor movement must have occurred, and assigning the signal edges occurring during a period between the times $t_2$ and $t_3$ to the new direction of the motor movement, and correcting the counter's count due to the previous direction of motor movement by one count if level length of one of the digitized signals after the first signal edge occurs, which follows time $t_2$, is less than the level length of the immediately following complementary level of the digitized signals.

4. A method according to claim 3 wherein the digitized signals are evaluated after one of said control commands, for a motor stop occurs, given manually or by the logical evaluation device, and wherein the step of evaluating further comprises the steps of determining the motor after-running time $t_{23}$, by which the motor movement stops, following such motor stop control command;

upon expiration of such time $t_{23}$, edge reversing of the signal edges which are assigned in the step of assigning, for an opposite direction of motor movement;

checking the count of the counter by 1. comparison of the level length $P_{01}$ before such motor stop control command with the level length $P_{10}$ after such motor stop control command of one of said digitized signals, and a) if $P_{01} > P_{10}$, correcting the count of the counter by one unit, because the reversal of the direction of motor movement took place prior to $t_{23}$;

b) if $P_{01} < P_{10}$, no correction is made of the count of the counter because the reversal of the direction of motor movement took place after time $t_{23}$;

2. issuing another said control command, after such motor stop command, to again start motor movement, only after the motor movement has come to a stop following such stop control command.

5. A method for detecting the position of a part and the direction of movement of a motor moving the part using a single position sensor which provides a single train of digitized signals and a logical evaluation device, comprising the steps of counting assigned signal edges of the digitized signals with a counter; and evaluating, using the logical evaluation device, the signal edges of the digitized signals, control commands and state of movement of the motor, the step of evaluating comprising the steps of either assigning, for the counting, high signal edges of said digitized signals to one direction of the motor movement and low signal edges of said digitized signals to the other direction of motor movement, dependent on motor direction of movement given by one of the control commands and length of the one control command, or assigning, for the counting, one of the high or low signal edges of said digitized signals together with one of the signal levels of the digitized signals at the motor movement start up time and the motor movement reversal time, the steps of assigning, comprising the step of assigning the signal edges dependent on
- a minimum after-running time delta $t_{min}$ of the motor which is a result of a time difference between a time $t_1$ identifying the time of occurrence of said control commands and a time $t_2$, before which substantially no reversal of direction of the motor movement is possible due to the motion impetus of the motor, and
- a maximum after-running time delta $t_{max}$ of the motor which is a result of a time difference between time $t_1$ and a time $t_3$, before which a reversal of the direction of the motor movement must have occurred; and if one of the control commands for a direction of the motor movement is present and if digitized signals are absent for a predetermined period of time, issuing said control commands to stop the motor movement and reversing the signal edges which are assigned in the step of assigning, wherein the following signal edges are assigned to the opposite direction of the motor movement, and issuing one of said control commands to start the motor movement, after the motor movement has come to a stop.

* * * * *

UNITED STATES PATENT AND TRADEMARK OFFICE
CERTIFICATE OF CORRECTION

PATENT NO. : 5,780,988
DATED : July 14, 1998
INVENTOR(S) : Roland Kalb; Jurgen Seeberger It is certified that error appears in the above-identified patent and that said Letters Patent is hereby corrected as shown below:

On the title page, Abstract, line 8, change "control" to -- controls --.
In the Drawings, FIG. 5C, Sheet 6, in block 452 replace "SIGAL" with
 -- SIGNAL --.
Column 1, line 32, replace "turns,," with -- turns, --.
Column 2, line 23, delete "of benchmarks".
Column 2, lines 25, 49, after "of the motor" delete the parenthesis
 (both occurrences).
Column 3, line 33, change "time $t_2$1" to -- time $t_2$, --.
Column 4, line 44, change "time t,." to -- time $t_1$. --.
Column 6, line 22, replace "For example, speed is, for example, given" with
 -- For example, speed is given --.
Column 9, line 33, replace "an foreign" with -- a foreign --.
Column 11, line 13, after "lowering" delete the comma.
Column 11, lines 31,32, after "command is less" delete "than the it is
 following the stop command".

Signed and Sealed this

Twenty-fourth Day of August, 1999

Attest:

Q. TODD DICKINSON

*Attesting Officer*  *Acting Commissioner of Patents and Trademarks*